United States Patent
Song et al.

(10) Patent No.: US 10,468,146 B2
(45) Date of Patent: Nov. 5, 2019

(54) COMBUSTION CONTROLLER FOR COMBUSTIBLE GAS

(71) Applicant: Korea Atomic Energy Research Institute, Daejeon (KR)

(72) Inventors: Jin Ho Song, Seoul (KR); Hwan Yeol Kim, Daejeon (KR); Yong Mann Song, Daejeon (KR); Kwang Soon Ha, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 362 days.

(21) Appl. No.: 14/516,501

(22) Filed: Oct. 16, 2014

(65) Prior Publication Data
US 2015/0108128 A1    Apr. 23, 2015

(30) Foreign Application Priority Data
Oct. 17, 2013 (KR) .................. 10-2013-0123981

(51) Int. Cl.
*G21C 19/303* (2006.01)
*G21D 3/06* (2006.01)
(Continued)

(52) U.S. Cl.
CPC .......... *G21D 3/06* (2013.01); *G21C 19/303* (2013.01); *G21C 19/317* (2013.01); *G21F 9/02* (2013.01); *Y02E 30/40* (2013.01)

(58) Field of Classification Search
CPC ...... F23G 7/085; G21C 19/303; G21C 19/317; G21F 9/02
(Continued)

(56) References Cited

U.S. PATENT DOCUMENTS 3,668,889 A * 6/1972 Magnusson ............. F23L 17/04
126/307 R
3,679,372 A * 7/1972 Hartman, Jr. ............ G21C 9/00
376/300
(Continued)

FOREIGN PATENT DOCUMENTS

CA    1314277 C    3/1993
CN    1244945 A    2/2000
(Continued)

*Primary Examiner* — Steven B McAllister
*Assistant Examiner* — Desmond C Peyton
(74) *Attorney, Agent, or Firm* — Knobbe Martens Olson & Bear LLP (57) ABSTRACT

Provided is a combustion controller for a combustible gas of a pressurized water reactor nuclear power plant, and more particularly, to a combustion controller for a combustible gas installed in a rear end of a filtered vent system outside a containment vessel or an external chimney, configured to convert a combustible gas such as hydrogen, carbon monoxide, or the like, into steam, carbon dioxide, or the like, and simultaneously, operate by itself with no external power supply. Accordingly, the combustion controller for a combustible gas can perform stable combustion control with no probability of explosion of hydrogen through a recombining reaction of the combustible gas, prevent discharge of carbon monoxide, which is a toxic gas, and prevent backward flow of the flame through the quenching mesh.

8 Claims, 8 Drawing Sheets

(51) Int. Cl.
*G21F 9/02* (2006.01)
*G21C 19/317* (2006.01)

(58) Field of Classification Search
USPC .................................... 431/121, 341, 202, 5
See application file for complete search history.

(56) References Cited

U.S. PATENT DOCUMENTS

| | | | | |
|---|---|---|---|---|
| 4,008,050 | A * | 2/1977 | Betz | B01J 8/04 422/614 |
| 4,228,132 | A * | 10/1980 | Weems | C01B 5/00 376/300 |
| 4,911,879 | A * | 3/1990 | Heck | C01B 5/00 376/301 |
| 5,312,843 | A * | 5/1994 | Yamauchi | C07C 29/1516 205/637 |
| 6,942,846 | B1 * | 9/2005 | Eckardt | G21C 9/06 422/177 |
| 7,700,055 | B2 * | 4/2010 | Manabe | F23D 14/22 376/300 |
| 2003/0163233 | A1 * | 8/2003 | Song | G06Q 10/06 701/31.4 |
| 2009/0116607 | A1 * | 5/2009 | Song | G21C 9/016 376/280 |
| 2014/0376679 | A1 * | 12/2014 | Song | G21C 15/18 376/282 |
| 2015/0108128 | A1 * | 4/2015 | Song | G21C 19/303 220/88.2 |

FOREIGN PATENT DOCUMENTS

| | | |
|---|---|---|
| CN | 1167078 C | 9/2004 |
| KR | 10-0335830 B1 | 5/2002 |
| KR | 20-0464123 Y1 | 12/2012 |
| KR | 10-1312857 B1 | 9/2013 |

* cited by examiner

COMBUSTION CONTROLLER FOR COMBUSTIBLE GAS

CROSS-REFERENCE TO RELATED APPLICATION

This application claims priority to and the benefit of Korean Patent Application No. 10-2013-0123981, filed on Oct. 17, 2013, the disclosure of which is incorporated herein by reference in its entirety.

BACKGROUND

1. Field of the Invention

The present invention relates to a combustion controller for a combustible gas of a pressurized water reactor nuclear power plant, and more particularly, to a combustion controller for a combustible gas installed in a rear end of a filtered vent system outside a containment vessel or an external chimney, configured to convert a combustible gas such as hydrogen, carbon monoxide, or the like, into steam, carbon dioxide, or the like, and simultaneously, operated by itself with no external power supply.

2. Discussion of Related Art

While a filtered vent system of a containment vessel installed at a nuclear power plant performs a function of discharging hydrogen, carbon monoxide and a non-condensable gas to the atmosphere, when hydrogen and a combustible gas are rapidly discharged to the atmosphere, combustion of the hydrogen occurs. In particular, when air is introduced from the outside, combusted flame may cause a backfire in a direction of filtered vent equipment. Accordingly, as the flame is generated, an exhaust tower or an exhaust chimney may be damaged, and of course, when the backfire occurs, the equipment may be seriously damaged according to circumstances. In particular, when carbon monoxide is incompletely combusted to be directly discharged to the atmosphere, the carbon monoxide may be harmful to human bodies.

Meanwhile, a passive apparatus for removing hydrogen is installed in the containment vessel. The passive apparatus is a passive autocatalytic recombiner PAR system. According to a scale of the containment vessel of the nuclear power plant, about 20 to 40 passive apparatuses are installed to remove hydrogen from the containment vessel through hydrogen catalyst combustion.

The above-mentioned conventional PAR is a passive PAR disclosed in Korean Utility Model Publication No. 20-0464123, and includes a cover body having an inlet port formed at a lower end thereof and through which air including hydrogen gas is introduced, discharge ports formed at three surfaces of an upper end thereof and through which the introduced air is discharged, and a guide plate inclined from the three surfaces toward the remaining surface to guide the air flow to the discharge ports; a honeycomb type catalyst body mounted on a lower end of the cover body to react with the introduced hydrogen gas to remove hydrogen; and a catalyst body housing assembly, on which the catalyst body sits, configured to detachably mount the catalyst body on the lower end of the cover body, wherein a roof plate installed on the three surfaces, in which the discharge ports are formed, is provided on an upper end of the cover body to prevent liquid dropped from above from being introduced into the cover body through the discharge ports.

However, even when an automatic catalyst coupler is installed in the containment vessel, a combustible gas such as hydrogen, carbon monoxide, and so on, in the containment vessel is discharged to the atmosphere through the filtered vent equipment while being incompletely oxidized when the combustible gas is exhausted to the outside of the containment vessel through the filtered vent equipment. Accordingly, even when the passive automatic catalyst recombiner disclosed in the related art is installed in the containment vessel, additional equipment is needed to remove a combustible gas such as hydrogen or carbon monoxide, which is unavoidably discharged to the outside. However, the PAR disclosed in Korean Utility Model Publication No. 20-0464123 is a structure that cannot be installed at the rear end of the filtered vent equipment outside the containment vessel or the external chimney.

CITATION LIST

Patent Literature (Patent Literature 1) Korean Utility Model Publication No. 20-0464123

SUMMARY OF THE INVENTION

In order to solve the problems, the present invention is directed to a combustion controller for a combustible gas installed at a rear end of filtered vent equipment outside a containment vessel or a rear end of other exhaust equipment and capable of performing stable combustion control with no probability of explosion of hydrogen through a stable recombining reaction of air with a combustible gas, preventing discharge of toxic carbon monoxide, and preventing backfire of flame through a quenching mesh. In addition, the controller may be used in a discharge pipe of the combustible gas in equipment of a general industry.

According to an aspect of the present invention, there is provided a combustion controller for a combustible gas which includes: a support frame having a combustible gas inlet port formed at a lower end thereof and a fluid inlet port formed at a side surface thereof; a quenching mesh disposed on the combustible gas inlet port or under an outlet port of the combustion controller for a combustible gas and fixed to the support frame; and at least one recombiner disposed on or under the quenching mesh and fixedly installed at the support frame.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and a method of accomplishing these will be apparent from embodiments described below with reference to the accompanying drawings.

However, the present invention is not limited to the embodiments described below but may be implemented in various modifications. The following embodiments are described in order to enable those of ordinary skill in the art to embody and practice the present invention. To clearly describe the present invention, parts not relating to the description are omitted from the drawings.

Like reference numerals refer to like elements throughout the description of the drawings.

Hereinafter, a combustion controller for a combustible gas according to an exemplary embodiment of the present invention will be described with reference to the accompanying drawings, but some elements not related to the spirit of the present invention will be omitted or simplified. However, the omitted elements are not necessary elements in the present invention but may be coupled and used in the present invention by those skilled in the art.

Figure 1:
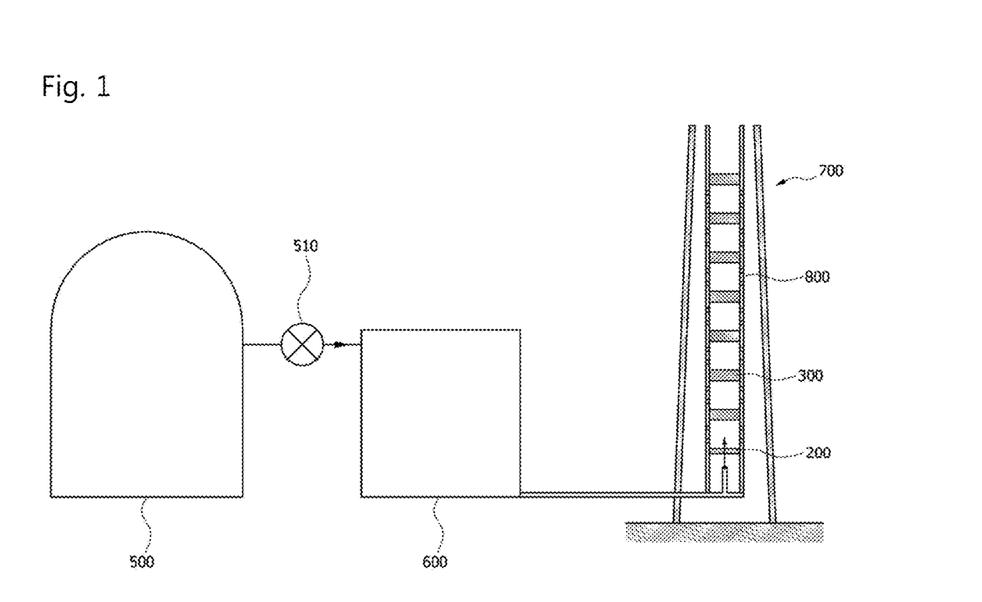
FIG. 1 is a view showing a combustion controller for a combustible gas according an embodiment of the present invention.

FIG. 1 is a view showing an embodiment of a combustion controller for a combustible gas according to the present invention.

As shown in FIG. 1, a containment vessel pressure regulation valve 510 to be opened when a pressure in a containment vessel 500 reaches a certain pressure or more is installed outside the containment vessel 500 to uniformly maintain a pressure in the containment vessel 500.

Since the containment vessel pressure regulation valve 510 is automatically opened when the pressure in the containment vessel 500 reaches a certain value or more regardless of a hydrogen concentration in the containment vessel 500, a combustible gas and radioactive substances present in the containment vessel 500 are discharged to the containment vessel pressure regulation valve 510 with air to be introduced into filtered vent equipment 600. Here, since the filtered vent equipment 600 performs a function of removing radioactive vapor and fission products included in the introduced air, when the radioactive vapor and the fission products included in the introduced air are removed, concentrations of hydrogen and carbon monoxide in the gas discharged from the filtered vent equipment 600 are increased to relatively high levels. Accordingly, since the combustible gas such as hydrogen, carbon monoxide, and so on, included in the gas discharged from the filtered vent equipment 600 should be removed so as not to be discharged to the outside, an automatic catalyst recombiner should be installed in a nuclear power plant chimney 700 through which the gas filtered in the filtered vent equipment 600 is discharged.

While the combustion controller for a combustible gas according to the embodiment of the present invention shown in FIG. 1 has been described as being installed in the nuclear power plant chimney 700, the present invention is not limited thereto, it may be installed in the filtered vent equipment 600. In this case, the combustion controller for a combustible gas may be installed in a flow path of a combustible gas or a storage tank of a combustible gas disposed in the filtered vent equipment 600.

Figure 2:
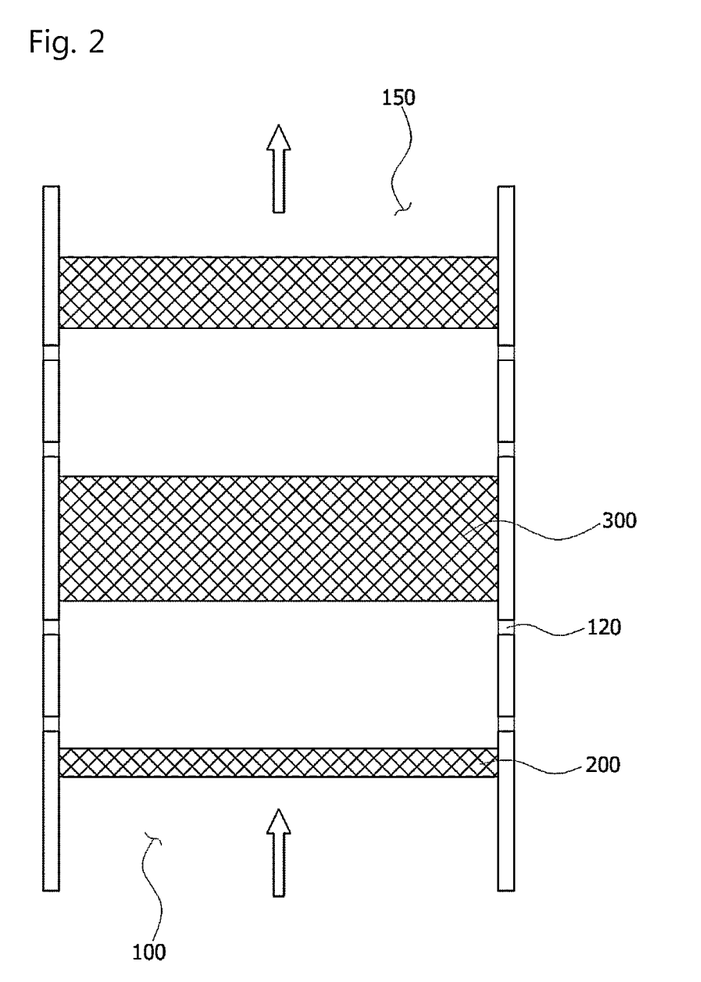
FIG. 2 is a cross-sectional view showing a configuration of the combustion controller for a combustible gas of a pressurized water reactor of FIG. 1.

FIG. 2 is a cross-sectional view showing a configuration of the combustion controller for a combustible gas of FIG. 1.

As shown in FIG. 2, the combustion controller for a combustible gas according to the embodiment of the present invention includes a support frame having an outlet port 150 formed at an upper end thereof, and an external fluid inlet port 120 configured to be open at the bottom so as a combustible gas inlet port 100 to be formed at a lower end thereof through which a combustible gas is introduced, and formed at a sidewall of the support frame to introduce external air, a quenching mesh 200 disposed over the combustible gas inlet port 100 and coupled and fixed to one side of the support frame, and a recombiner 300 disposed over the quenching mesh 200 and coupled and fixed to one side of the support frame.

While the quenching mesh 200 of the embodiment of the present invention shown in FIG. 2 has been described as being disposed over the combustible gas inlet port 100, the present invention, is not limited thereto. The quenching mesh 200 may be installed under the outlet port 150 of the combustion controller for a combustible gas.

Accordingly, the combustible gas discharged from the outlet port of the filtered vent equipment 600 is introduced into the nuclear power plant chimney 700 through the combustible gas inlet port 100, and here, the external fluid inlet port 120 may have a structure in which the combustible gas can be easily introduced from the outside into the inside, rather than discharged from the inside to the outside.

Meanwhile, the combustible gas introduced into the combustible gas inlet port 100 passes through the quenching mesh 200 to arrive at the recombiner 300 having a honeycomb structure, and the quenching mesh 200 is installed to prevent backfire of flame and propagation of the flame performs a stable recombining reaction. That is, a temperature of the flame is decreased due to heat transfer to the quenching mesh 200 while the flame propagates through the quenching mesh 200 to decrease intensity of the flame, and in a chemical aspect, the quenching mesh 200 changes an active radical that accelerates a chain branching reaction into a stable chemical species, and thus, reduces a chemical reaction rate to decrease the intensity of the flame.

Accordingly, when a level of the heat transfer and a level of a radical termination reaction are intensified to a certain level or more, the flame may be extinguished, and hydrogen combustion can be controlled using flame intensity attenuation and flame extinguishing phenomena.

Figure 3A:
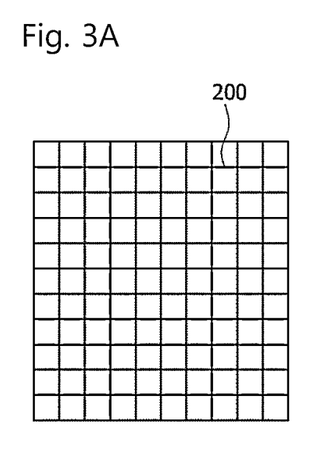
FIG. 3A is a view showing a quenching mesh of a first embodiment of FIG. 2.
Figure 3B:
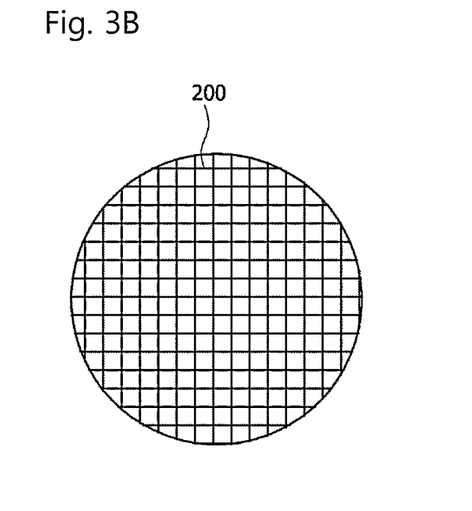
FIG. 3B is a view showing a quenching mesh of a second embodiment of FIG. 2.

FIGS. 3A and 3B are views showing embodiments of the quenching mesh of FIG. 2.

As shown in FIGS. 3A and 3B, the quenching mesh 200 configured to prevent propagation of the flame is a fine metal net structure, which may be a stainless steel net structure, and the size and structure of the grid of the quenching mesh 200 can be different according to a type of the combustible gas.

The combustible gas passing through the quenching mesh 200 is introduced into the recombiner 300 with the air introduced from the fluid inlet port 120, and the combustible gas reacts with the oxygen included in the air. Here, as shown in the drawings, a shape of quenching mesh may be modified according to a shape of the recombiner.

Figure 4A:
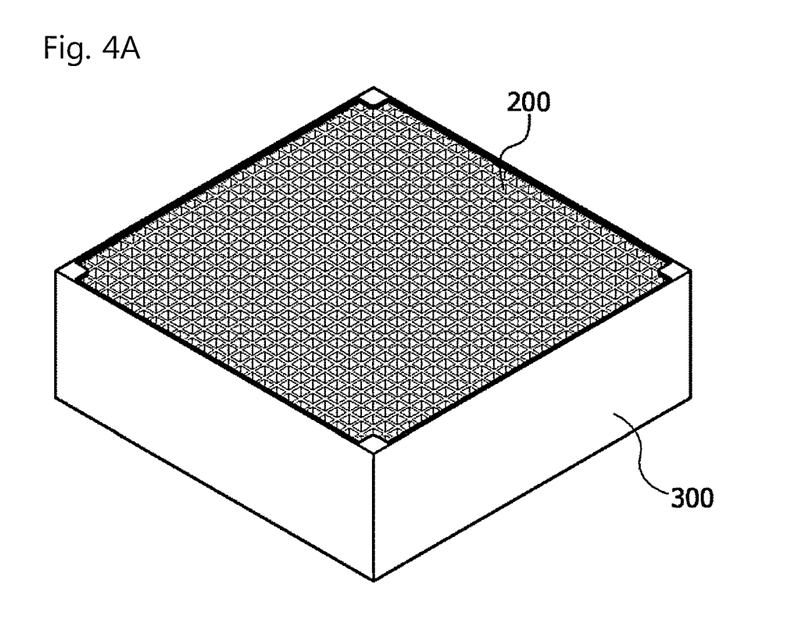
FIG. 4A is a perspective view showing a recombiner of the first embodiment of FIG. 2.
Figure 4B:
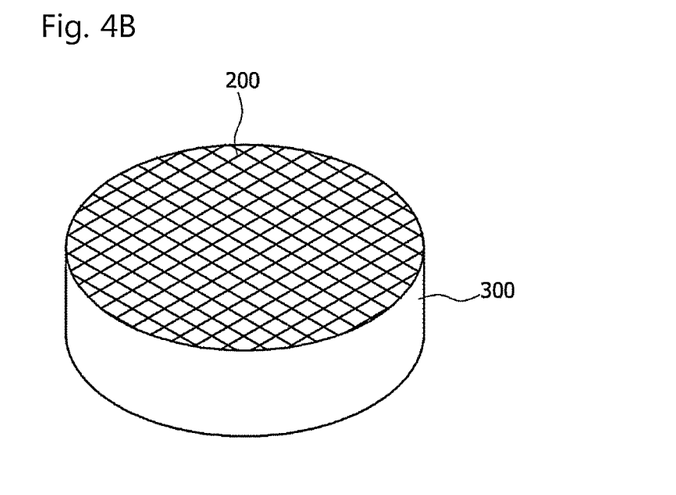
FIG. 4B is a perspective view showing a recombiner of the second embodiment of FIG. 2.

FIGS. 4A and 4B are perspective views showing embodiments of the recombiner of FIG. 2.

As shown in FIGS. 4A and 4B, the recombiner 300 is a structure in which a catalyst is coated on a surface of the honeycomb structure, and a mixture of platinum or palladium and titanium dioxide or alumina may be used as the catalyst that can recombine the hydrogen and carbon monoxide. The recombiner 300 according to the present invention is not limited to the above-mentioned honeycomb structure and may be formed as a plate structure.

A material of the catalyst is not particularly limited as long as the hydrogen gas reacts with the oxygen to be removed. For example, alumina is coated and then platinum is coated thereon to be used as the catalyst. The recombiner 300 shown in FIGS. 4A and 4B are installed in a chimney 700 in a multi-stage such that all of the combustible gas is completely oxidized and then discharged to the outside. Here, the recombiner 300 may be formed in various shapes such as a circular or rectangular shape according to necessity as long as the recombiner 300 can be fixed in the chimney.

Meanwhile, combustion may occur over the recombiner 300 when the concentrations of hydrogen and carbon monoxide are high. In this case, the flame may flow backward. In order to prevent the backward flow, the quenching mesh 200 is installed under the recombiner 300 as described above.

The combustible gas passing through the quenching mesh 200 is introduced into the recombiner 300 with the air introduced through the fluid inlet port 120, and the combustible gas reacts with the oxygen included in the air to be converted into steam, carbon dioxide, a non-condensable gas, and so on. Since such a reaction is generally an exothermic reaction and the gas is heated, the combustible gas can be discharged by the effect of buoyancy when the combustion controller for a combustible gas is installed in a gravity direction. That is, most of the gases are discharged over the combustion controller for a combustible gas by buoyancy, and a flow rate of the combustible gas discharged to the external atmosphere through the inlet port can be almost neglected. In addition, since the buoyancy of the combustible gas is generated by the heat generated upon recombining and the combustible gas is moved to above the recombiner 300 and discharged, the combustion controller for a combustible gas can be driven as passive equipment without separate power.

As described above, since the combustible gas is converted into steam, carbon dioxide, a non-condensable gas, or the like, by recombining of the combustible gas and the air, safe combustion control with no probability of explosion of hydrogen can be performed. In addition, discharge of toxic carbon monoxide can be prevented, and backward flow of the flame can be prevented through the quenching mesh 200.

Figure 5:
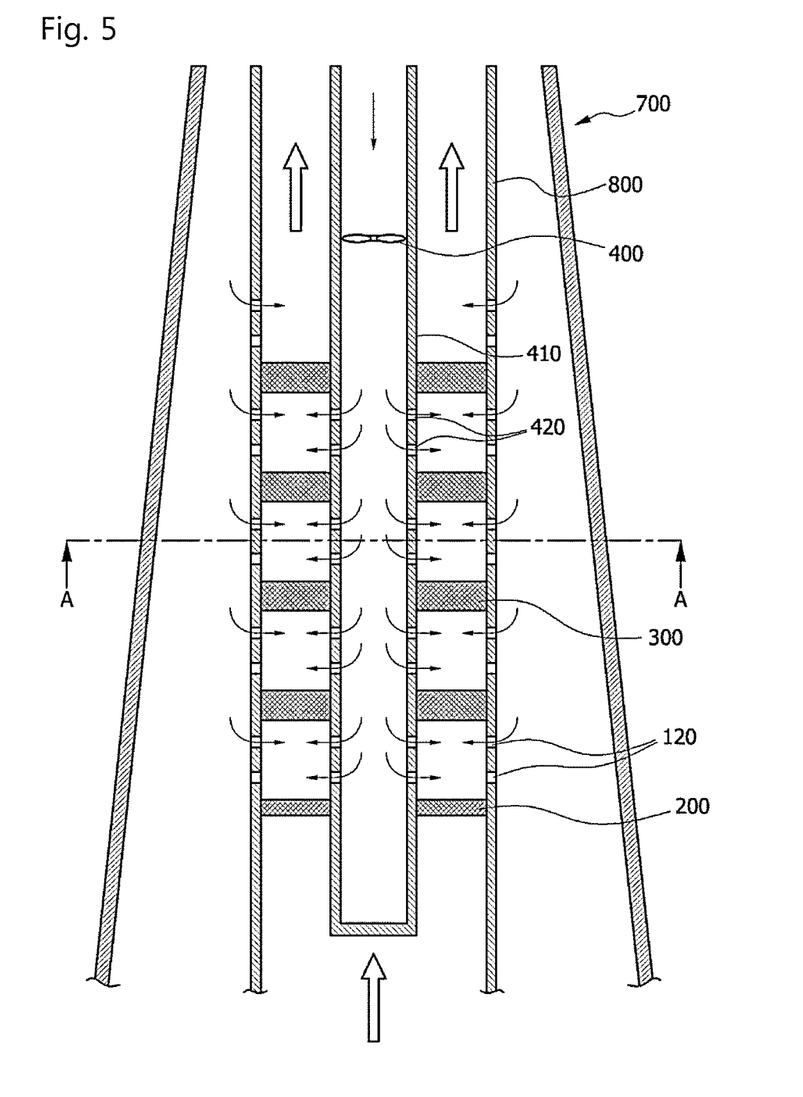
FIG. 5 is a view showing an installation state of a fan of the combustion controller for a combustible gas according to the present invention.
Figure 6:
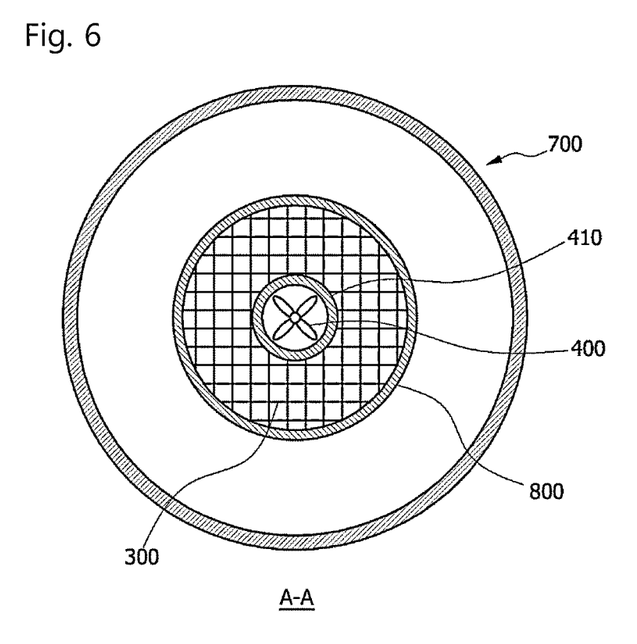
FIG. 6 is a cross-sectional view taken along line A-A of FIG. 5.

FIG. 5 is a view of another embodiment of the combustion controller for a combustible gas of the nuclear power plant according to the present invention, showing a state in which a separate fan is installed, and FIG. 6 is a cross-sectional view taken along line A-A of FIG. 5.

As shown in FIG. 5, the combustion controller for a combustible gas is installed in an annular section of the chimney 700, and a fan 400 is installed at an upper portion of a center of the annular section such that the external air (the atmosphere) is forcibly introduced into a lower portion of the center of the annular section. The center of the annular section functions as an external air introduction passage 410, and the air introduced at this time can pass through a fan fluid inlet port 420 to smoothly discharge the combustible gas introduced into the combustible gas inlet port 100 through the outlet port of the nuclear power plant chimney 700. In this case, the recombiner 300 and the quenching mesh 200 are configured as an annular shape formed along a periphery of the external air introduction passage 410 as shown in FIG. 6. Here, the quenching mesh 200 may be selectively installed on or under the recombiner 300. However, the combustion controller of a combustible gas having the annular shape according to the embodiment has the annular section, a lower portion of which is closed, such that any of the combustible gas introduced into the external air introduction passage 410 is prevented from being directly discharged to the atmosphere.

Meanwhile, FIG. 6 is a view of another embodiment of the recombiner 300 having an annular shape, showing a cross-sectional view taken along line A-A of FIG. 5. As shown in FIG. 6, the support frame 800 has an annular shape, the fan 400 is installed at the center of the annular section, and the recombiner 300 having an annular shape is installed in the support frame 800.

As can be seen from the foregoing, the combustion controller for a combustible gas according to the present invention is installed at the exhaust pipe or the exhaust chimney of the filtered vent equipment outside the containment vessel and capable of performing stable combustion control with no probability of explosion of hydrogen through a recombining reaction of the combustible gas, preventing discharge of carbon monoxide, which is a toxic gas, and preventing backward flow of the flame and propagation of the flame through the quenching mesh.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A nuclear power plant exhaust system comprising:
 a chimney comprising at least one chimney wall that defines a chimney channel with a chimney inlet and a chimney outlet, wherein the chimney inlet is connected to an exhaust outlet of a nuclear reactor containment structure and configured to receive, from the exhaust outlet, an exhaust gas comprising a combustible component;
 a combustion apparatus installed inside the chimney channel and comprising a support frame, a plurality of recombiners, and a quenching mesh;
 the support frame comprising at least one sidewall that defines a hollow channel extending along and inside the chimney channel and that also separates the hollow channel from a chimney space that is inside chimney channel but outside the hollow channel;
 a first one of the plurality of recombiners installed inside the hollow channel over the quenching mesh and comprising a recombiner mesh and a combustion catalyst coated on the recombiner mesh, wherein the first recombiner is configured to burn at least part of the combustible component contained in the exhaust gas flowing in the hollow channel as the exhaust gas passes through the recombiner mesh;
 the quenching mesh installed inside the hollow channel under the first recombiner; and
 at least one hole formed between the quenching mesh and the first recombiner through the at least one sidewall of the support frame and configured to allow air introduction into the hollow channel therethrough.

2. The system according to claim 1, wherein the first recombiner has a honeycomb structure or a plate structure.

3. The system according to claim 2, wherein the combustion catalyst is a mixture of platinum or palladium and titanium dioxide or alumina.

4. The system according to claim 1, wherein the first recombiner is installed in a multi-stage manner.

5. The system according to claim 1, wherein the chimney inlet is connected to a filtering equipment disposed outside the nuclear reactor containment structure, the filtering equipment connected to the exhaust outlet.

6. The system of claim 1, wherein the hollow channel is referred to as a first hollow channel, wherein the system further comprises a second hollow channel extending along the first hollow channel inside the first hollow channel, wherein the second hollow channel is separated from the first hollow channel by at least one additional side wall, wherein the system further comprises a fan configured to blow air such that the air flows through the second hollow channel in a downward direction, wherein the system further comprises at least one hole formed between the quenching mesh and the first recombiner through the at least one additional sidewall and configured to allow air blown in the downward direction to flow into the first hollow channel therethrough.

7. The system of claim 6, wherein a bottom portion of the second hollow channel is close.

8. The system of claim 6, wherein the fan is installed inside the second hollow channel at higher than the recombiner.

* * * * *